United States Patent [19]

Del Rosso

[11] 4,143,752
[45] Mar. 13, 1979

[54] MULTIPLE DISTRIBUTION CONVEYOR SYSTEM

[75] Inventor: Victor Del Rosso, Ithaca, N.Y.

[73] Assignee: Hi-Speed Checkweigher Co., Inc., Ithaca, N.Y.

[21] Appl. No.: 779,291

[22] Filed: Mar. 21, 1977

[51] Int. Cl.² ............................................. B65G 43/00
[52] U.S. Cl. ................................. 198/365; 198/358; 198/437; 198/440; 198/796
[58] Field of Search ............... 198/356, 358, 365, 437, 198/440, 451, 492, 793, 796, 439

[56] References Cited

U.S. PATENT DOCUMENTS

| | | | |
|---|---|---|---|
| 3,279,581 | 10/1966 | Drennan | 198/451 |
| 3,731,782 | 5/1973 | Rosso | 198/439 |
| 3,749,225 | 7/1973 | Kennedy | 198/437 |
| 3,986,597 | 10/1976 | Valentino | 198/358 |
| 3,987,888 | 10/1976 | Wickam | 198/437 |

Primary Examiner—Joseph E. Valenza
Attorney, Agent, or Firm—Bean, Kauffman & Bean

[57] ABSTRACT

A conveyor system adapted to receive a random flow of discrete items from a plurality of sources at its infeed end and to discharge an evenly distributed flow of items to a multiplicity of stations at an output end. Provision is made for skipping one of the multiplicity of stations if it is not capable of accepting additional items. Provision is also made for avoiding interruptions of the flow of distributed items when the inflow of items from one of the plurality of sources is interrupted.

18 Claims, 4 Drawing Figures

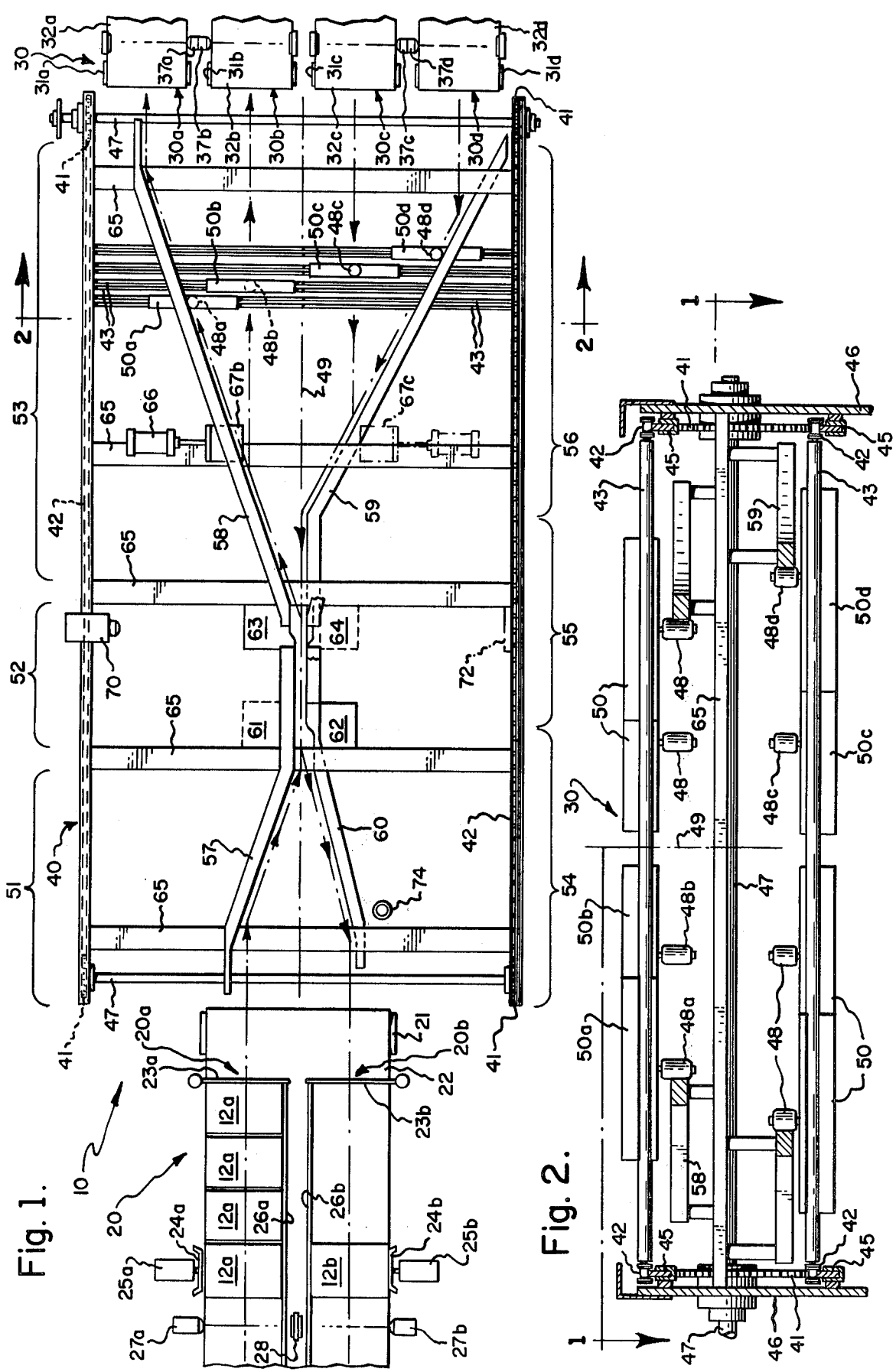

MULTIPLE DISTRIBUTION CONVEYOR SYSTEM

BACKGROUND OF THE INVENTION

The present invention relates generally to a distribution conveyor system. More specifically, the invention relates to a conveyor system which evenly distributes a flow of products to a multiplicity of downstream lines from a plurality of infeed lines which supply a flow of products which may be either uniform or random. Accordingly, the general object of the present invention is to provide novel and improved apparatus and method of such character.

In the numerous industrial situations involving production lines, a plurality of upstream sources provide product units which are delivered to a multiplicity of downstream stations which further handle the articles or which package the articles for ultimate disposition, such as shipment. Maximum efficiency is obtained when the products originating from the plurality of upstream stations are uniformly distributed to the multiplicity of downstream stations so that all downstream equipment operate at design capacity rather than being either overloaded or being inadequately supplied. It has previously been known to converge the flow of products from a plurality of upstream stations into a single flow and to diverge the flow of products into a multiplicity of downstream lines for delivery to the multiplicity of downstream stations.

Problems have been known to arise in prior art solutions to this merge and diverge task, however, in that merging device is prone to jamming caused by the interference of two of the articles with one another in the coverging process. In devices having moving mechanical guides such as swing gates, the moving parts, such as the pivotal bearings, are subject to wear and early failure and the swing gates may crush a product unit if the unit is not precisely positioned U.S. Pat. No. 3,774,748 issued Nov. 27, 1973, discloses a merging conveyor which avoids these mechanical problems caused by mechanical push directors by relying on a conveyor having transversely translatable slider supports on which the product units rest and which themselves alternately converge from two lines to a single line. This device is subject to the difficulty that a product unit may be pushed off of the slider supports either by another unit from the other line or by one of the sliders which may catch on the edge of the product unit during the merging motion as the sliders from one line are slid under the product units of the other line. A similar device is shown in FIG. 11 of U.S. Pat. No. 3,731,782 issued May 8, 1973.

These and other prior art devices and combinations thereof are not capable of providing a smoothly and efficiently operating system which is equipped to deal with the additional problems of random flow from the plurality of upstream stations as well as failure of one of the downstream stations resulting in one of the multiplicity of receiving stations being unable to accept a continuing flow of products. In such situations, it is desirable to have a distribution system which continues to accept whatever articles are available from the upstream sources and which continues to deliver an even and uniform flow of articles to those remaining downstream stations which are able to accept a product flow. In prior art distribution systems, the backup of products in one discharge lane would ultimately cause the distribution system to shut down, thereby terminating the flow of products to all downstream stations including those stations which are capable of continued operation. Thus, all of the downstream equipment, as well as the upstream equipment, would have to lie idle until the problem with the backed up lane was cured. Inefficient overall operation of both the down and upstream equipment was the unavoidable result.

SUMMARY OF THE INVENTION

The present invention provides an improved distribution system which overcomes the disadvantages of the prior art and which receives a random flow of discrete items from a plurality of sources and discharges an evenly distributed flow of items to those stations of a multiplicity of stations capable of receiving a continuing flow of items.

The distribution system includes a plurality of infeed lines originating at the upstream sources and gated at their discharge ends. The gates are arranged to accumulate a predetermined quantity of articles before they are released. An article availability sensor is provided to sense when the predetermined quantity has been collected. The discharge gates for each of the lines are sequenced to discharge their collected articles in a round robin line-to-line sequence. A control signal is provided to disable the discharge gates of a particular infeed line if the predetermined quantity of items are not available for discharge.

A converge/divide conveyor is provided adjacent to and downstream of the infeed lines for receiving, converging, distributing and discharging the articles delivered by the infeed lines. The converge/divide conveyor has a converging section, a single file section and diverging section through which the units move. A sensor is provided for detecting the presence of individual articles or for detecting the presence of a group of articles. The sensor generates a switching signal which causes a control unit to switch the flow of items to the next discharge line in sequence. The discharge lines discharge to a multiplicity of downstream stations which may or may not be capable of receiving additional product units.

Additional sensor means detect the able-to-accept/not-able-to-accept status of the downstream stations and generate a signal indicative of the disability of one or more of the downstream stations. When a disability signal is received, the discharge line aligned with the disabled station is skipped over by a control system and the flow of products is diverted or switched to the next discharge line aligned with the next station capable of accepting a continuing flow of items. In the event that all of the downstream stations are disabled, an alarm is activated and/or the distribution system is shut down.

SUMMARY OF THE DRAWINGS

The present invention may be better understood and its numerous objects and advantages will become apparent to those skilled in the art by reference to the accompanying drawings wherein like reference numerals refer to like elements in the several figures and in which:

FIG. 1 is a plan view of the preferred embodiment of the distribution system taken along the view lines 1—1 of FIG. 2 and in which the top surface of the central merge/diverge conveyor is shown above the center line and its bottom surface is shown below the center line;

FIG. 2 is an end section view of the merge/diverge conveyor taken along the view lines 2—2 of FIG. 1;

DESCRIPTION OF THE PREFERRED EMBODIMENT

Figure 3:
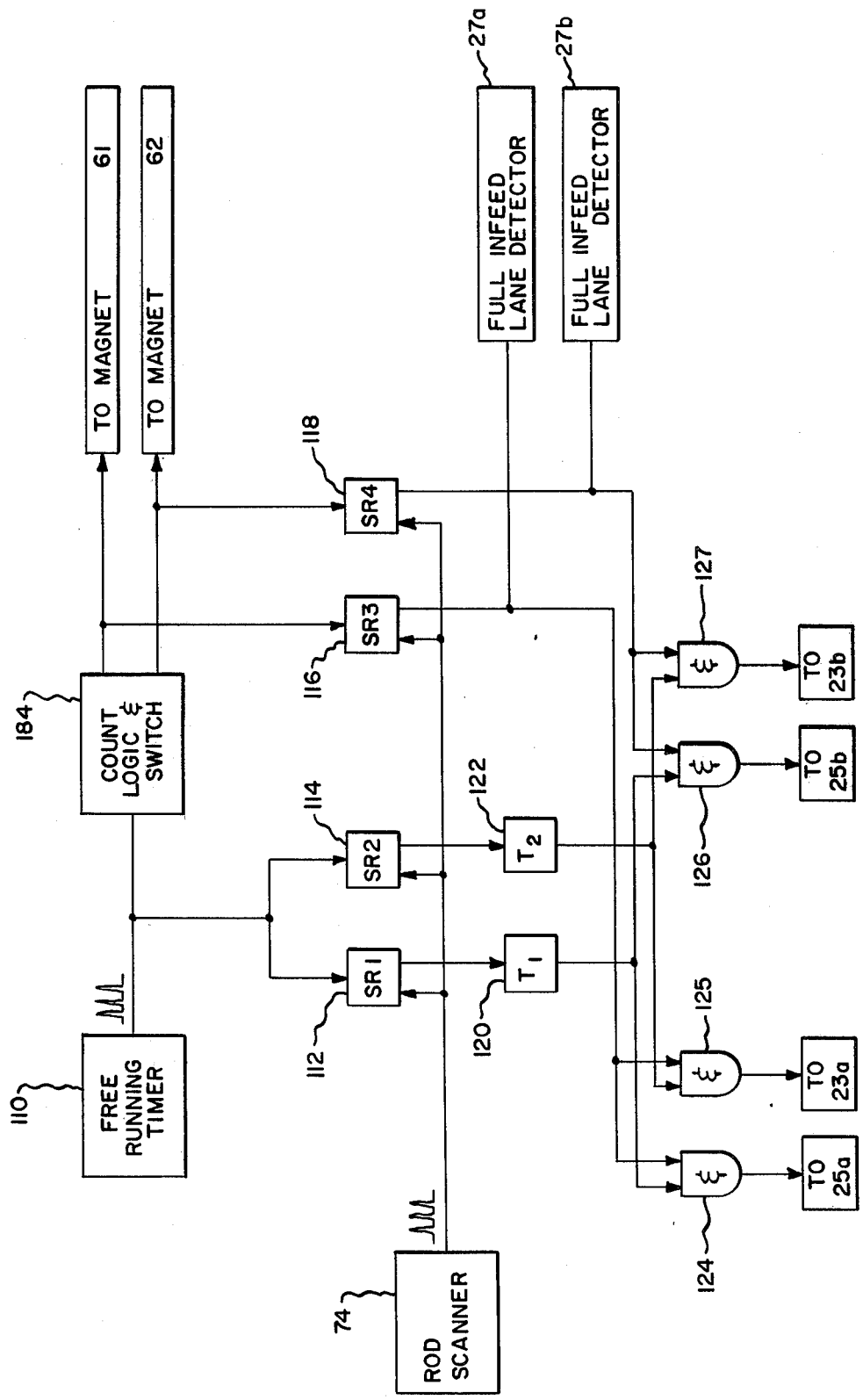
FIG. 3 is a functional block diagram of the control system which control the discharge of product units from the infeed lines and the merge section of the merge/diverge conveyor of FIGS. 1 and 2.

In a preferred embodiment of the invention the conveyor system is illustrated generally at 10 in FIG. 1 and comprises generally a source conveyor 20, a delivery station 30 and an intermediate distribution conveyor 40. Source conveyor 20 consists of a multiplicity of laterally displaced infeed lines, two of which are exemplified as 20a and 20b. Cylinder 21 is shown supporting an endless conveyor belt 22, the upper surface of which supports discrete articles or product units 12a and 12b in their separate infeed lines 20a and 20b.

Infeed article discharge flow controlling means or gates 23a-b and 24 a-b are provided as means to regulate the flow of the articles discharged from lines 23a and 23b respectively. Guide rails 26a-b guided the product units 12 and act as back-up plates against which the product units are squeezed by gates 24a and 24b in order to halt flow of the product units. Gates 24a, 24b are operated respectively by reciprocating cylinders 25a and 25b which may be of any suitable type such as magnetically operated solenoids or pneumatically operated pistons. Gates 23 and 24 are longitudinally spaced along the direction of flow of products in the product lines 20 by a distance which permits the accumulation of a preselected number of product units therebetween (three units being shown).

Gates 23 are normally in a flow blocking configuration whereas gates 24 are normally in a flow passing configuration. Gates 24 are controlled to temporarily close while gates 23 are opened, thereby permitting the group discharge of only those units 12 trapped between gates 23 and 24. Gates 24 are held in a closed position long enough to interrupt the product flow to a degree that permits the subsequent closure of gates 23 after the discharge of the group of collected articles.

Product sensors or scanners 27a and 27b are provided to determine when there are sufficient numbers of articles available in each line to permit the accumulation of the appropriate number of items between gates 23 and 24 for their eventual discharge down the line to its exit. In a preferred embodiment, sensors 27 are infra-red transmitting and receiving photoelectric sensors which transmit a beam of infra-red radiation across the article path to be reflected by reflector 28 and subsequently detected by detector 27. The sensors 27 are incorporated into a control system (to be described hereinafter) in a manner such that the sensor does not generate a signal on the transitory passage of one of the articles but generates a signal only when the light beam is blocked for a period of time longer than is necessary for the unimpeded passage of an article past the sensor.

A discharge station 30 is provided downstream of the distribution means 40. In the embodiment described herein, discharge station 30 consists of a multiplicity of individual receiving stations 30a-d having receiving ends and each of which includes an endless conveyor belt 32a-d supported at one end by conveyor belt cylinders 31a-d. Conveyors 30a-d may deliver the articles delivered to them to a single machine such as a packing machine having a number of lanes or to separate delivery stations such as separate packing machines. Each conveyor 30a-d is provided with a disablement sensor for determining whether additional artricles can be received by each of the conveyors 30a-d. Such a means may consist of scanners shown at 37a-d which are provided to detect a condition of back-up on the conveyors 30a-d and which are similar to the sensors 27 provided for the infeed lines. Alternatively, the disablement sensor means may simply consist of a manually actuated switch which is activated when a delivery station is removed from operation for one reason or another such as repairs.

The distribution conveyor mechanism 40 shown in the drawing may consist of any unitary conveyor means which accomplishes the functions of receiving the flow of items at its receiving end, converging the flow to an intermediate position in which the items flow in a single line, and subsequently separating the flow of itmes to evenly distribute them to the multiplicity of receiving stations. A typical mechanism 40 may be a magnetic flow director similar to the director described in previously cited U.S. Pat. No. 3,731,782. Such magnetic flow directors consist of an endless conveyor as shown in FIGS. 1 and 2 having side chains 42 trained over end sprockets 41. Sprockets 41 are fixedly mounted on a transverse drive shaft 47, which is driven by any suitable means (not shown). Each of the side chains 42 is supported and guided on suitable guide means 45 during both its upper run and its return lower run. Guide means 45 is carried on a framework 46.

The links of chains 42 are pivotally connected to pairs of transversely extending parallel guide rods 43. By referring specifically to FIG. 2, it will be seen that each pair of adjacent transverse guide rods 43 serve to support a single article carrier 50 for independent movement transversely of the path of conveyor travel. Article carriers 50 have journaled centrally on the bottom thereof a roller 48. Roller 48 is preferably formed of a magnetically attractable material, such as for instance a ferro-magnetic material, which permits the roller and thus the article carrier 50 to be magnetically attracted to permanent magnets or to electromagnets.

In order to facilitate an understanding of the merge/diverge section 40 of this system 10, section 40 has been drawn in FIG. 1 so that the upper portion of the conveyor is shown above the center line 49 whereas the lower section of the conveyor (the return path) has been shown below center line 49. An understanding of the view of FIG. 1 is assisted by the end view of FIG. 2 in which is shown the view line 1—1. It can be seen that view line 1—1 cuts the conveyor along a horizontal plane and along the center plane containing line 49. The upper surface of the conveyor is identical on both sides of line 49 and are mirror images of one another. Similarly, the lower surface of the conveyor is also the same on both sides of line 49 and may be reconstructed by visualizing a mirror image.

The upper flight of the conveyor consists of three sections 51, 52 and 53. Section 51 is a converging section in which the carriers 50, after receiving a product unit 12 from belt 22, are directed to the center line of the distribution conveyor 40. This action is accomplished by roller 48 being forced to follow the camming surface of the bar 57. Guide bar 57 is held laterally in position between framework members 46 by cross struts 65. As the carriers 50 progress downstream, they enter a central section 52 in which they all travel in a single file.

Further downstream, the carriers 50 enter the distribution section 53 of the distribution conveyor 40. Selective activation of electromagnets 63 or 64 (64 shown in phanthom) causes the carrier 50 to de diverted either to the right or to the left and to become magnetically linked with permanent magnet 58 in a manner which is completely described in the previously cited U.S. Pat. No. 3,731,782. Once placed in magnetic contact with the permanent magnet 58, the carrier 50a continues downstream while at the same time being deflected to follow the path of the magnetic bar 58. This trend continues until the carrier 50a reaches the termination of the magnetic bar 58 where the carrier 50a dips down towards the bottom return flight of the conveyor 40 and the product unit is transferred to belt 30a.

Intermediate the two ends of the permanent bar magnet 58, there is positioned a "peeler" 67 which may be reciprocally activated to provide a surface along which the carrier 50b is deflected in order to break the carrier roller 48b away from the magnetic attraction of the permanent bar magnet 58. Once this separation has been affected, the carrier 50b continues to travel straight downstream without deflection until it discharges its product unit to belt 30b in a manner similar to that previously described for discharge to line 30a. An actuating mechanism 66 such as a solenoid or a pneumatically driven cylinder reciprocates the "peeler" 67 in order to affect the separation of the carrier 50b from the permanent magnet 58. A procedure similar to that previously described for lines a and b is followed with respect to lines c and so that the distribution conveyor 40 shown has the capability of delivering product units to a four-fold multiplicity of discharge lines a, b, c and d.

The mechanism previously discussed for the upper flight of the conveyor 40 is basically repeated on the lower return flight. Accordingly, guide bars 59 collect the carriers 50a–d and cause them to converge in a converging section 56 into a single file section 55. After passing through this central single file section 55, the product carriers 50 are caused to diverge in lower flight diverging section 54 by the selective activation of electromagnets 61 and 62 to split the flow of carriers 50 into two lines a and b in preparation for receiving the product units discharged from lines 20a and 20b.

Referring now to FIG. 3, the specific control arrangement for the operation of the diverge section 54 of the lower flight of the coveyor and the operation of gates 23, 24 which control the flow of products from the infeed lines, will be described. Timing means or free running timer 110 is provided to periodically generate a timing pulse or signal which is delivered to shift registers 112 and 114 as well as to count logic and switch unit 184. The function of the count logic and switch unit 184 is to alternately activate magnets 61 and 62 so that carriers 50 traversing the bottom run of the conveyor 40 are alternately deflected to infeed lines 20a and 20b. Functionally, the count logic and switching unit 184 operates like a bi-stable multivibrator which alternates between delivering an actuation signal to magnet 61 and to magnet 62 each time a pulse is received from the timer 110. Thus, carriers 50 are switched by magnets 61 to be delivered to infeed line 20a for the period of time between successive pulses delivered by timer 110. Subsequently, the carriers 50 are diverted to infeed line 20b by magnets 62 also for a period of time determined by the timer 110. Simultaneously, upon the arrival of carriers 50 at either infeed line 20a or 20b, the respective gates 23a, 24a or 23b, 24b are actuated to discharge articles onto the carriers.

Each time the timer 110 causes the count logic and switch unit 184 to switch between magnets 61 and 62, an activation signal is also delivered to shift registers 112 and 114. Additionally, each time magnet 61 is actuated, an activation signal is delivered to shift register 116 and each time magnet 62 is actuated, an activation signal is delivered to shift register 118. Shift registers 112, 114, 116 and 118 also receive a timing signal derived from a rod scanner 74 which is positioned to detect the passage of the conveyor rods 43. By this means, shift registers 112 and 114 are set to generate an output signal at a time corresponding to the time at which the carriers 50, having been deflected either by the magnet 61 ot 62, arrive in a position for receiving articles from either of the infeed lines 20a or 20b respectively. These signals are subsequently transmitted via delay means 120 and 122 and "and" gates 124, 126, and 125, 127 respectively to the actuators of flow blocking gates 24 and 23 respectively for each of the infeed lines 20a and 20b. "And" gates 124–127 however do not pass a signal unless another signal coincidentally exists at the other input of each of the "and" gates. As can be seen from FIG. 3, the other signal for the other inputs of each of the "and" gates 124–127 is derived from one or the other of shift registers 116 and 118 which are in turn responsive to the actuation signals delivered to the magnets 161 and 162 respectively. Thus, "and" gates 124 only passes an actuation signal to gate 25a when signals are being simultaneously received from the shift register 112 and from the shift register 116. Shift registers 112 and 116 simultaneously produce signals only when the carriers 50 are at the left hand end of the conveyor in a position ready to receive articles from the discharge end of infeed line 20a. Similarly, gate 23 is only activated when a signal is reached from both shift registers 114 and 116.

Timing elements 120 and 122 are provided for each of the gates 24 and 23 in order that signals delivered thereto from shift registers 112 and 114 have durations characteristic of the operation of the respective gates 24 and 23. Without going through the step by step explanation of the operation of gates 24b and 23b, it should be recognized from FIG. 3 that their operation is similar to that of gates 24a and 23a. As previously described, the actuation of gates 24a and 23a in such that gate 24a closes to pinch an article 12a and hold it in place while gate 23a opens thereby permitting the discharge of its accumulated articles down the infeed line for discharge onto the conveyor 40. Subsequently, gate 23a is closed and gate 24a is opened thereby releasing the flow of products so that they accumulate upstream of a now closed gate 23a. In this manner, a specific number of articles are accumulated and discharged at a given time.

Since it is desired that an equal number of articles be delivered to each of the downstream discharge lines 30a–d, the system is designed to discharge articles through escapement gates 23 only when a preselected number of items have been accumulated therebehind. In order to accomplish this, full infeed line detectors 27 are provided on each of the infeed lines to assure that each of the gates 23 has accumulated sufficient quantities of the articles before they are discharged. Accordingly, as can be seen in FIG. 3, full infeed line detectors 27 are connected to the control circuitry of the gates 23 and 24 in a manner that overrides their operation when the line is not detected to be full. Thus, through this electrical connection, when either of the infeed line detectors does not detect an article at its location, the detector generates a low signal which overrides the signal generated by either shift register 116 or shift register 118 so that a low signal is delivered to either of the respective pairs of "and" gates 124, 125, or 126, 127. In this situation, the affected "and" gates do not receive a requisite pair of signals at their inputs so an output gate actuation signal is not generated. Consequently, the affected gates 23 and 24 remain passive: gate 23 in its blocking condition and gate 24 in its passing condition. When the full line detector 27 detects an article at its position for a period of time greater than that required for an article to traverse the position unimpeded, the electrical output of the line detector does not override the signal originating from the shift registers 116 or 118 so that the respective signal is successfully delivered to the respective "and" gates and flow controlling gates 23, 24 are permitted to be actuated. In this manner, the infeed lines discharge articles only when the appropriate number of articles have been accumulated behind gates 23.

Figure 4:
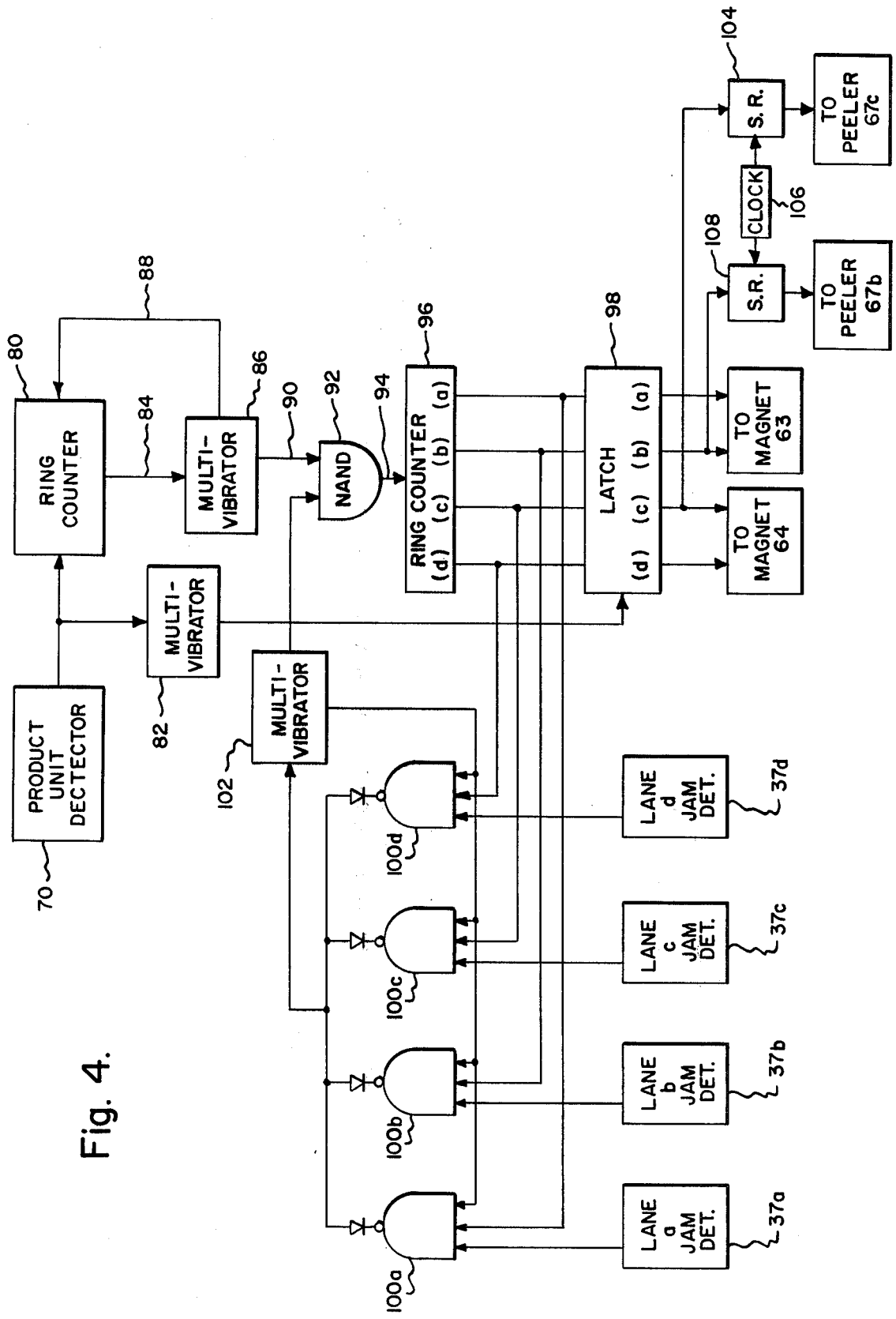
FIG. 4 is a functional block diagram of the control system which controls the diverge section of the merge/diverge conveyor of FIGS. 1 and 2.

Referring now to FIG. 4, the specific control arrangement for the operation of the diverging section 53 of the conveyor will be described. Article detector 70 is arranged to sense the passage of articles through the single file section 52. For each article that passes through the single file section, detector 70 sends a pulse to ring counter 80 and to monostable multivibrator unit 82. The ring counter 80 has been preset to count the number of articles up to a selected number, such as 3, before generating an output signal carried by conductor 84 which is delivered to monostable multivibrator 86. Upon receipt of this pulse from ring counter 80, the multivibrator 86 sends a reset signal via conductor 88 back to the ring counter 80 whereby the ring counter is reset at zero and the counting cycle may be repeated. A negative pulse is also sent along conductor 90 to "nand" gate 92.

"Nand" gate 92 is a commonly available electronic device which produces a high output at conductor 94 if either of the inputs to the "nand" gate 92 is low. Thus, the negative signal from unit 86 causes a positive signal to be generated by "nand" gate 92. This signal is delivered to ring counter 96. Ring counter 96 has a multiplicity of outputs equivalent in number to the number of individual receiving stations or lines into which the flow of articles is to be divided. Ring counter 96 accordingly provides a positive signal at one of the outputs a, b, c or d. This output signal is then delivered to electronic latch 98.

Electronic latch 98 is disabled from latching the signal received from ring counter 96 as long as a blocking signal is being received from the multivibrator 82 which, as previously described, is responsive to the package detector 70. In the present embodiment, monostable multivibrator 82 is selected to provide a signal having a pulse duration of two milliseconds.

The two millisecond disablement of latch 98 is provided in order to give the control system an opportunity to determine whether or not any of the downstream receiving stations a-d have been disabled. A receiving station disablement may consist of a jammed condition in which the articles back-up to a degree that the conveyor is no longer able to receive additional articles. In order to detect this condition, lane jam detectors 37a-37d have been provided to sense the presence of articles in each lane and to generate a signal when an article is sensed for a period of time longer than that required for the article to pass the sensor under normal operating conditions.

The output of the lane jam detectors 37 are connected to "nand" gates 100a-100d. Each of the "nand" gates 100a-d are connected respectively to the respective a-d outputs of the ring counter 96. In addition, a third input to the "nand" gates 100a-d is provided from monostable multivibrator 102. The outputs of the four "nand" gates 100a-d are connected in parallel and are delivered back to monostable multivibrator 102 which is such that it generates a low signal only when its input goes from high to a low. The low output signal of multivibrator 102 is not only delivered to an input of each of the "nand" gates 100a-d, but it is also delivered to "nand" gate 92.

The above described circuit operates as follows. The common output of the four "nand" gates 100a-100d is ordinarily high since none of the lanes 30a-30d are jammed. With this high signal, multivibrator 102 remains passive. Accordingly, package detector 70 and ring counter 80 detect and count the number of packages traversing the conveyor so that multivibrator 86 generates a signal each time the preselected number of packages have been counted. This low signal is delivered by 90 to "nand" gate 92 which generates a pulse for ring counter 96. Ring counter 96 in turn switches from one output to the next output in a round robin sequence in response to each pulse received. If the output signal is at the (b) channel, the signal is delivered to latch 98 and simultaneously to "nand" gate 100b. The latching action of latch 98 is delayed by the disable signal originating from multivibrator 82 for a period of two milliseconds.

Now, if at this time the jam detector of lane b shows that the lane is jammed, the jam detector 37b delivers a high signal to "nand" gate 100b. The normal state of the signal originating from the multivibrator 102 is a high signal and the signal originating from the ring counter 96 is also a high signal. Consequently, since all of the inputs to "nand" gate 100b are now high, the output is driven low which triggers the monostable multivibrator 102. Multivibrator 102 subsequently sends a low signal back to the series of "nand" gates 100a-d to return their output signals to a high value while at the same time sending a low signal to "nand" gate 92. This low signal causes the "nand" gate 92 to go high which subsequently causes the ring counter to advance from output b to output c. If lane c is not jammed, the lapse of the remainder of the two milliseconds causes the latch 98 to latch the signal on channel c and the signal is subsequently delivered downstream in a manner which actuates the deflecting mechanism so that the flow of articles is caused to skip over the jammed lane b and to be diverted to the available lane c.

According to the diagram of FIG. 4, it can be seen that a signal on the output of latch 98 is delivered not only to magnet 64 but also to shift register 104 and ultimately to the peeler actuator 57c. Shift registers 104 and 108 are responsive to free running clock 106 in order that an appropriate delay can be built into the system so that the peelers are actuated only when the appropriate article carriers 50 have arrived at the position of the peeler.

In summary, then, the control system shown in FIG. 4 detects the arrival or passage of articles along the conveyor 40, counts the articles and causes the appropriate number to be diverted to successive discharge stations. The control system also interrogates each of the discharge stations in sequence to determine if an individual station is incapable of receiving an additional flow of product units. If not, the system causes the disabled discharge station to be skipped over and articles are delivered to the next discharge station capable of receiving the flow of articles.

What is claimed is:

1. A distribution system for distributing articles to a plurality of receiving stations, wherein the system comprising:

a. a plurality of laterally displaced infeed lines which deliver a flow of articles to their respective discharge ends;
   b. means at the discharge end of each of said plurality of infeed lines for controlling the discharge of articles therefrom;
   c. a multiplicity of receiving stations having receiving ends;
   d. a unitary conveyor means adjacent to and intermediate the discharge ends of said infeed lines and said receiving ends of said receiving stations for transporting said articles from the discharge ends of said infeed lines to said multiplicity of receiving stations; and
   e. article deflection means operating in association with said conveyor means for converging the flow of articles received from said plurality of infeed lines into a single line and for diverting a selected number of said articles from said single line to each of said multiplicity of receiving stations in a round robin sequence.

2. The system as recited in claim 1 wherein said discharge controlling means includes means for sequentially discharging a predetermined number of articles from each of said infeed lines.

3. The system as recited in claim 2 further including means for sensing the presence of said predetermined number of articles at each of said infeed lines respectively, and wherein said discharge controlling means includes means responsive to said sensing means for disabling the respective article discharge controlling means when said respective sensing means fails to detect the presence of said predetermined number of articles.

4. The system as recited in claim 1 further including means for sensing the respective disablement of each of said multiplicity of receiving stations and wherein said article deflection means includes control means responsive to said receiving station disablement sensing means for causing said deflection means to skip a disabled receiving station in said round robin sequence so that articles are not diverted thereto during receiving station disablement.

5. The system as recited in claim 1 including sensing means for sensing the number of articles traversing said conveyor and for causing said deflection means to divert said selected number of articles to the next receiving station in said round robin sequence after said selected number of articles have been diverted to the prior receiving station in said sequence.

6. The system as recited in claim 2 wherein said article discharge controlling means include first and second flow blocking gates, said first gate being upstream of said second gate and spaced by a distance equal to the distance required to accumulate said predetermined number of articles therebetween, and further including means for causing said first gate to assume a flow blocking position while said second gate assumes a flow permitting position.

7. The system as recited in claim 1 wherein said discharge controlling means includes first and second flow blocking gates, said first gate being upstream of said second gate and spaced by a distance equal to the distance required to accumulate a selected number of articles therebetween, said system further including control means for sequentially actuating said article discharge controlling means to sequentially discharge said selected number of articles from each of said infeed lines, said control means including means for causing said first gate to assume a flow blocking position while said second gate assumes a flow permitting position, said article discharge controlling means further including means for sensing the presence of said predetermined number of articles at each of said infeed lines respectively, and wherein said control means further includes means responsive to said sensing means for disabling the respective article discharge controlling means when said respective sensing means fails to detect the presence of said predetermined number of articles; said system also further including means for sensing the respective disablement of each of said multiplicity of receiving stations, means responsive to said receiving station disablement sensing means for causing said deflection means to skip a disabled receiving station in said round robin sequence so that articles are not diverted thereto, and sensing means for sensing the number of articles traversing said conveyor and for causing said deflection means to divert said selected number of articles to the next receiving station in said round robin sequence after said selected number of articles have been diverted to the prior receiving station in said sequence.

8. The system as recited in claim 5 further including means for sensing the respective disablement of each of said multiplicity of receiving stations and wherein said article deflection means includes control means responsive to said receiving station disablement sensing means for causing said deflection means to skip a disabled receiving station in said round robin sequence so that articles are not diverted thereto.

9. The system as recited in claim 1 wherein said conveyor is a magnetic flow director having a closed path including upper and lower runs, said lower run being the return run, said magnetic flow director including article carriers spaced apart in the direction of said path and supported for independent movement transversely of said path, each of said carriers having magnetically attractable portion, said magnetic flow director including means on both said upper and lower runs for converging said carriers into a single file and magnetic means for subsequently selectively causing said carriers to be diverted into one of a multiplicity of diverging paths.

10. The system as recited in claim 4 wherein said conveyor is a magnetic flow director having a closed path including upper and lower runs, said lower run being the return run, said magnetic flow director including article carriers spaced apart in the direction of said path and supported for independent movement transversely of said path, each of said carriers having a magnetically attractable portion, said magnetic flow director including means on both said upper and lower runs for converging said carriers into a single file and magnetic means for subsequently selectively causing said carriers to be diverted into one of a multiplicity of diverging paths.

11. The system as recited in claim 9 further including control means for controlling the diversion of said carriers and for causing groups of said carriers to be diverted on said lower run in a round robin sequence to positions on said conveyor adjacent to said discharge ends of said plurality of laterally displaced infeed lines.

12. The system as recited in claim 11 wherein said discharge controlling means includes means for discharging said articles from said infeed lines only when said carriers are positioned to receive said articles.

13. The system as recited in claim 12 further including means for sensing the presence of a predetermined number of articles at each of said infeed lines respectively, and wherein said discharge controlling means includes means responsive to said sensing means for disabling the respective article discharge controlling means when said respective sensing means fails to detect the presence of said predetermined number of articles.

14. A method of receiving articles from a plurality of sources and distributing the articles to a multiplicity of stations, wherein said method comprising the steps of:
a. selectively discharging accumulations of articles cyclicly from each of said sources onto one end of a unitary conveyor;
b. converging the paths followed by said articles to form a single path on said unitary conveyor; and
c. cyclicly distributing groups of said articles to said multiplicity of stations by causing successive groups to sequentially follow paths on said unitary conveyor each originating at said single path and terminating at a different one of said multiplicity of station.

15. The method as recited in claim 14 wherein said step of selectively discharging includes the steps of:
a. accumulating at least a predetermined number of said articles from a given source prior to discharging the accumulation onto said conveyor;
b. sensing the accumulation of articles and determining if the accumulation contains no less than said predetermined number; and
c. permitting the discharge of the accumulation of articles onto said conveyor only if the accumulation contains no less than said predetermined number.

16. The method as recited in claim 15 wherein said step of cyclicly distributing groups of said articles to said multiplicity of stations includes the steps of:
a. sensing the number of articles traversing said conveyor;
b. determining whether any of said stations are incapable of receiving additional articles; and
c. cyclicly switching articles from one path to the next sequential path which terminates at a station capable of receiving additional articles after a preselected number of articles have been sensed.

17. The method as recited in claim 16 wherein said conveyor is a magnetic flow director having a closed path including upper and lower runs, said lower run being the return run, said magnetic flow director including article carriers spaced apart in the direction of said path and supported for independent movement transversely of said path, each of said carriers having a magnetically attractable portion, said magnetic flow director including means on both upper and lower runs for converging said carriers into a single file and magnetic means for subsequently selectively causing said carriers to be diverted into one of a multiplicity of diverging paths.

18. The method as recited in claim 17 further including the step of diverting groups of said carriers on said lower run, in a round robin sequence, to positions on said conveyor adjacent to the discharge end of said sources, and wherein said step of selectively discharging accumulations of articles onto one end of a unitary conveyor is prevented unless said carriers are positioned to receive said articles.

* * * * *